(12) United States Patent
Price et al.

(10) Patent No.: US 12,123,986 B2
(45) Date of Patent: Oct. 22, 2024

(54) DELAY AND APODIZATION CONTROL INTERFACE FOR ULTRASOUND BEAMFORMER

(71) Applicant: Analog Devices, Inc., Norwood, MA (US)

(72) Inventors: Michael R. Price, Cambridge, MA (US); Eric G. Nestler, Long Beach Township, NJ (US); Mikael Mortensen, Cambridge, MA (US); Ashraf Saad, San Diego, CA (US)

(73) Assignee: Analog Devices, Inc., Wilmington, MA (US)

( * ) Notice: Subject to any disclaimer, the term of this patent is extended or adjusted under 35 U.S.C. 154(b) by 477 days.

(21) Appl. No.: 16/395,945

(22) Filed: Apr. 26, 2019

(65) Prior Publication Data

US 2019/0361102 A1   Nov. 28, 2019

Related U.S. Application Data

(60) Provisional application No. 62/675,002, filed on May 22, 2018.

(51) Int. Cl.
*G01S 7/52* (2006.01)
(52) U.S. Cl.
CPC ................ *G01S 7/52034* (2013.01)
(58) Field of Classification Search
None
See application file for complete search history.

(56) References Cited

U.S. PATENT DOCUMENTS

| 5,349,262 A | * | 9/1994 | Grenon | G01S 15/8927 310/334 |
| 5,555,534 A | * | 9/1996 | Maslak | G01S 15/8979 367/7 |
| 5,581,517 A | * | 12/1996 | Gee | G01S 7/52046 367/11 |
| 5,680,863 A | * | 10/1997 | Hossack | A61B 8/4494 600/459 |
| 5,685,308 A | | 11/1997 | Wright et al. | |

(Continued)

FOREIGN PATENT DOCUMENTS

| CN | 1808175 A | * | 7/2006 | ......... G01S 15/8904 |
| CN | 103237500 | | 8/2013 | |

(Continued)

OTHER PUBLICATIONS

Tomov, Borislav Gueorguiev. Compact beamforming in medical ultrasound scanners. Electronics & Signal Processing, Ørsted DTU, 2003. (Year: 2003).*

(Continued)

*Primary Examiner* — Isam A Alsomiri
*Assistant Examiner* — Jonathan D Armstrong
(74) *Attorney, Agent, or Firm* — Knobbe, Martens, Olson & Bear, LLP

(57) ABSTRACT

Systems and methods are provided for compressing and decompressing data in an ultrasound beamformer. The systems and methods include an encoder for compressing delay data based at least in part on a smoothness of a delay profile, and for compressing apodization data based at least in part on a smoothness of an apodization profile.

20 Claims, 11 Drawing Sheets

(56) References Cited

U.S. PATENT DOCUMENTS

| | | | | |
|---|---|---|---|---|
| 5,735,282 | A * | 4/1998 | Hossack | A61B 8/4494 600/458 |
| 6,368,279 | B1 * | 4/2002 | Liu | A61B 8/00 600/443 |
| 8,002,705 | B1 | 8/2011 | Napolitano et al. | |
| 8,317,706 | B2 * | 11/2012 | Wegener | A61B 8/13 600/443 |
| 2004/0258127 | A1 * | 12/2004 | Ramamurthy | A61B 8/546 374/117 |
| 2007/0016049 | A1 * | 1/2007 | Kye | G10K 11/346 600/447 |
| 2010/0331689 | A1 * | 12/2010 | Wegener | G01S 7/52034 600/443 |
| 2012/0108968 | A1 * | 5/2012 | Freiburger | A61B 8/0825 600/443 |
| 2012/0143059 | A1 | 6/2012 | Magee | |
| 2015/0201905 | A1 * | 7/2015 | Ivancevich | A61B 8/461 600/438 |
| 2016/0109563 | A1 | 4/2016 | Bae | |
| 2016/0187472 | A1 | 6/2016 | Chang et al. | |
| 2016/0349367 | A1 | 12/2016 | Duncan | |
| 2017/0146643 | A1 * | 5/2017 | Nestler | G10K 11/346 |
| 2017/0150946 | A1 | 6/2017 | Yoshizawa et al. | |
| 2017/0269199 | A1 | 9/2017 | He et al. | |

FOREIGN PATENT DOCUMENTS

| | | | | |
|---|---|---|---|---|
| CN | 105520752 | | 4/2016 | |
| CN | 106210719 | | 12/2016 | |
| CN | 106529121 A | * | 3/2017 | |
| CN | 107205729 A | * | 9/2017 | A61B 8/14 |
| CN | 108024798 | | 5/2018 | |
| EP | 0442450 A2 | * | 8/1991 | G10K 11/343 |
| EP | 3187896 | | 7/2017 | |
| JP | H09276266 A | | 10/1997 | |
| WO | WO-9603922 A1 | * | 2/1996 | G01S 15/8927 |

OTHER PUBLICATIONS

Hao, Cheong Jia. Efficient Sigma-Delta Beamforming Techniques for Ultrasound Imaging Application. Diss. Nanyang Technological University, 2009. (Year: 2009).*

Cruza, Jorge F., et al. "New method for real-time dynamic focusing through interfaces." IEEE Transactions on Ultrasonics, Ferroelectrics, and Frequency Control 60.4 (2013): 739-751. (Year: 2013).*

Wang, Ping, et al. "The research of compression and generation of high-precision dynamic focusing delay data for ultrasound beamformer." Cluster Computing 20.4 (2017): 3107-3117. (Year: 2017).*

Campbell, Nicholas A., and Jeremy A. Brown. "A Real-Time Dual-Mode High-Frequency Beamformer for Ultrafast and Focused Imaging." IEEE Transactions on Ultrasonics, Ferroelectrics, and Frequency Control 69.4 (2022): 1268-1276. (Year: 2022).*

English Translation [Patent Translate via espacenet.com] of CN108024798, 14 pages.

Office Action issued in Chinese Application No. 201910426465.6, dated Jul. 5, 2022.

* cited by examiner

DELAY AND APODIZATION CONTROL INTERFACE FOR ULTRASOUND BEAMFORMER

CROSS REFERENCE TO RELATED APPLICATION

This application claims priority to U.S. Patent Application Ser. No. 62/675,002 filed May 22, 2018, which application is considered incorporated by reference into the disclosure of this Application.

TECHNICAL FIELD OF THE DISCLOSURE

The present invention relates to the field of ultrasound beamforming.

BACKGROUND

Ultrasound uses echolocation for detection and imaging. Ultrasound waves are transmitted into a tissue, and echoes of those ultrasound waves reflect back to the transmitter. The reflected ultrasound waves vary depending on the type of tissue. Ultrasound machines use arrays of microphones and speakers for excitation and recording of echoes from the item being investigated. A signal including ultrasonic energy is transmitted through an ultrasound transducer in short pulses. After each pulse, for a short period of time correlating to the amount of time for the ultrasonic energy to reach a target and reflect back to the transducer, the ultrasound machine receives reflected signals. Signals received during the short period undergo additional signal processing to determine the source locations of targets from which the signals reflected.

An ultrasound beamformer with dynamic receive focus uses a unique delay and apodization (gain) command for each channel and each sample. However, given the large number of channels in an ultrasound beamformer, the commands can amount to an uncompressed data rate of over 80 Gigabits (Gb)/second. For compressing data, some ultrasound systems use a simple "delta" encoding for delays which is exact but provides a very low compression ratio.

SUMMARY OF THE DISCLOSURE

Systems and methods for compressing and decompressing the data in an ultrasound beamformer are provided. Circuit architectures are provided for decompressing the delay and apodization commands for controlling a beamformer with dynamic receive focus. The systems and methods discussed herein reduce input/output requirements and achieve approximately a fifty times compression ratio. Additionally, the digital circuit area and power used for decompression are minimized.

According to some implementations, a system for compressing and decompressing data in an ultrasound beamformer includes an encoder configured for compressing delay data based at least in part on a smoothness of a delay profile, and configured for compressing apodization data based at least in part on a smoothness of an apodization profile, and a decoder including a multiplier, an adder, and a multiplexor, wherein the decoder is configured for decompressing compressed delay data and wherein the decoder is configured for decompressing compressed apodization data.

In some implementations, the encoder and the decoder include a simple source synchronous parallel interface for connecting to the beamformer. In some implementations, the encoder uses a low-order polynomial fitting to capture a change in delay data across an ultrasound beamformer transducer over time. In some implementations, the encoder uses local corrections to compensate for polynomial fitting errors.

In some implementations, a system for compressing and decompressing data in an ultrasound beamformer includes multiple transducer channels, and a transducer channel delay for each transducer channel is a difference between a selected output sample time and a time-of-flight from a transmit origin to a focal point and back to a transducer element.

According to some implementations, a method for compressing data in an ultrasound beamformer, includes encoding differences in delay between samples, generating a delay profile using spatially smooth polynomial fit to capture a change in delay data across an ultrasound beamformer transducer over time, generating an apodization profile using scaling coefficients to capture a change in apodization data across the ultrasound beamformer transducer over time, and sending the delay profile and the apodization profile to the beamformer.

In some implementations, the method further includes periodically updating the delay profile and the apodization profile. In some implementations, generating a delay profile includes extracting temporal differences in delay data. In some implementations, generating an apodization profile includes extracting shape parameters in apodization data.

In some implementations, the method further comprises compressing the delay profile based at least in part on a smoothness of the delay profile. In some implementations, the method further comprises converting the delay profile to input-referred form before compressing the delay profile. In some implementations, the method further comprises compressing the apodization profile based at least in part on a smoothness of the apodization profile.

In some implementations, the method further comprises decompressing compressed delay data. In some implementations, the method further comprises decompressing compressed apodization data. In some examples, decompressing includes a decompression block that uses a single fixed-point multiplier per channel. In some examples, the decompressing includes a decompression block that uses a fixed-point adder.

In some aspects, a system for compressing and decompressing data in an ultrasound beamformer comprises a sequencer configured to generate a plurality of delay profiles and a plurality of apodization profiles and an ultrasound beamformer. Each delay profile corresponds to one of plurality of channels and each apodization profile corresponds to one of a plurality of channels. The sequencer is further configured to compress each of the plurality of delay profiles and each of the plurality of apodization profiles. The ultrasound beamformer comprises a plurality of decoders, wherein each of the plurality of decoders is configured to decompress a respective compressed delay profile and a respective compressed apodization profile.

In some implementations, the sequencer is configured to compress each of the plurality of delay profiles based at least in part on a smoothness of the delay profile, and to compress each of the plurality of apodization profiles based at least in part on a smoothness of the apodization profile.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
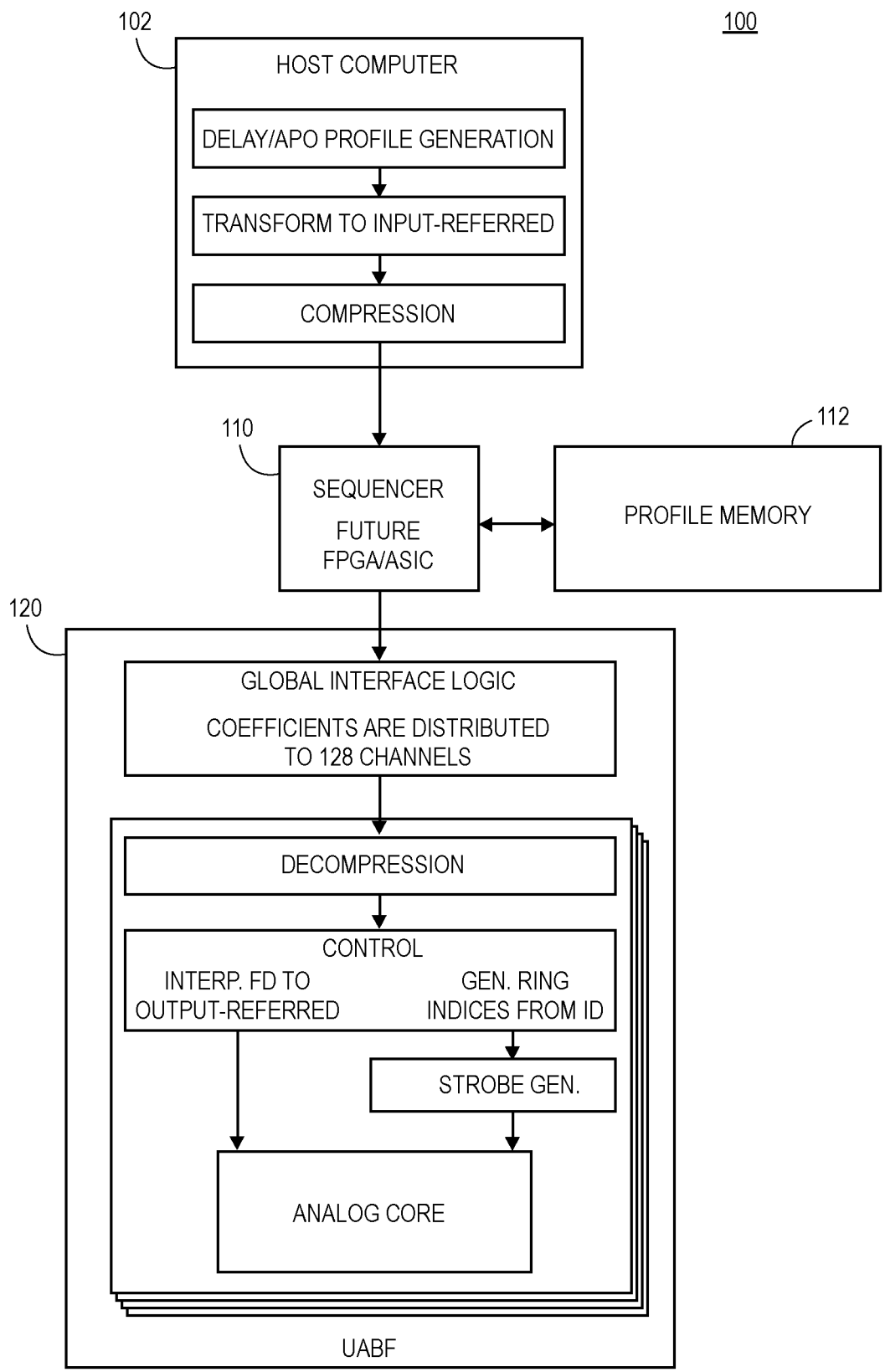
FIG. 1 is a diagram illustrating components of a system including an ultrasound analog beamformer (UABF), according to some embodiments of the disclosure.

An ultrasound transducer transmits the ultrasound waves and receives the reflected echoes of the ultrasound waves. Beamforming techniques are used to narrow the field of view of the transducer. Ultrasound imaging products use delay-and-sum beamforming to focus transmit and receive pressure waves. Sampled Analog Technology (SAT) can perform delay-and-sum beamforming functions in the analog domain, thereby reducing the use of resources such as memory and power. However, the delay and apodization (gain) commands are specified for each channel and each sample, and transferring the commands between ultrasound components can amount to an uncompressed data rate of over 80 Gigabits (Gb) per second (Gb/s). Systems and methods are provided for an encoder and decoder to compress the delay and apodization data in ultrasound beamforming, resulting in a data volume that is approximately fifty times smaller than the raw data.

In traditional systems, dynamic receive focusing techniques can be used to focus the ultrasound data at all points throughout the image. Dynamic receive focusing techniques generate the highest resolution ultrasound images. An ultrasound beamformer with dynamic receive focus requires a unique delay and apodization (gain) command to be specified for each channel and each sample, and thus has a very high data rate. In one example, a beamformer has 128 channels, 11-bit delay and 5-bit apodization precision, and a 40 Megahertz (MHz) sample rate, and the uncompressed data rate is 82 Gigabits per second (Gb/s). The delay and apodization commands are computed by a sequencer that may reside on a different chip from the beamformer. Transmitting such a high volume of data between two chips results in interface engineering challenges (including package/PCB parasitics, equalization, and error correction) and high input/output (I/O)-related power consumption.

A high volume of data is used to control the various delay lines in the beamformer. As noted above, the beamformer has many analog inputs (e.g., 32 analog inputs, 64 analog inputs, 128 analog inputs, or 256 analog inputs). The beamformer includes a delay line for each channel or analog input that can delay each of the analog inputs by a specified number of samples, and the delay for each channel is a function of the geometry and imaging scenario, such as the kind of transducer and the shape of the imaging target. Because the delay is different for every element of the transducer and changes constantly over time, there is a large volume of data for transmission.

In one example, the beamformer is manufactured using CMOS technology, with the process node selected based on analog design considerations (e.g., 0.18 micrometers), and thus there may be limited space for digital logic on the same chip as the beamformer. Thus, there are two separate chips—one is the beamformer, and one to control the beamformer. Additionally, compressing and decompressing data allows for reduction of the memory on the chip and a reduced number of I/O signals going into the chip.

According to various aspects, systems and methods are provided for an encoder (algorithm) and decoder (algorithm and architecture) to compress the delay and apodization data, resulting in a data volume that is approximately fifty times smaller than the raw data. With the reduction in bandwidth for transmitting the delay and apodization data, a simple source synchronous parallel interface can be used between the sequencer and the beamformer.

The encoder disclosed herein uses the smoothness in the delay and apodization profiles in ultrasound imaging to compress the delay and apodization data. In particular, the delay and apodization profiles vary only slightly between different neighboring elements of the ultrasound transducer, and over time from one sample to the next. In one implementation, a low-order polynomial fitting is used to capture the change in delays across the transducer over time, and local corrections can compensate for fitting errors.

Sampled Analog Technology (SAT) refers to systems in which an incoming analog signal is used directly in the system without first being converted to a digital signal. Sampled analog technology signal processing is performed in the analog domain by charge sharing among capacitors using only electronic switches and capacitor elements. A sampled analog filter filters incoming analog signals without first digitizing the signals. Sampled analog technology uses discrete time filter architectures combined with analog signal processing, which eliminates any data path quantization noise issues and analog-to-digital and digital-to-analog conversion steps.

FIG. 1 is a diagram illustrating components of a system 100 including an ultrasound analog beamformer (UABF) 120, according to some embodiments of the disclosure. A host computer 102 prepares control sequences offline and stores them in memory 112 for later use. The memory 112 stores compressed coefficients for the scanlines in the current imaging scenario. A digital sequencer 110 reads the commands out to the UABF 120 in real-time.

According to one implementation, the UABF 120 is a delay-and-sum beamformer having 128 delay lines. The outputs of the 128 delay lines are added together (via charge sharing) to construct an output charge. While the signal path operates in the (sampled) analog domain, it is digitally controlled. The control signals represent a delay and apodization (gain) for each delay line. These variables are coordinated across channels (and synchronized with the transmit puller) so the beamformer output provides maximum gain for scatterers (signals reflected from a selected focal point) at a certain focal point in the imaging volume, and minimal gain everywhere else. For each scanline, the focal point starts near the transducer and moves away at approximately half the speed of sound (dynamic receive focus). Images are thus built up line-by-line with one transmit pulse per scanline. The control pipeline is a series of algorithmic steps that transform the transducer and image geometry into numerical commands and, ultimately, a sequence of pulses (strobes) that control the switches in the analog core. The time-of-flight to and from the focal point determine the desired delay, and the location of the focal point determines the apodization. Each channel has its own sequence of delay and apodization commands. The collection of sequences of delay and apodization commands is a delay/apodization profile ("profile"). Each scanline in each imaging scenario uses a different profile. In other implementations, the UABF 120 is a delay-and-sum beamformer having 64 delay lines.

According to various implementations, the delay, apodization, and summation operations are performed using switches and capacitors. The switches are turned on and off by control signals called strobes. Many of the switches are used to connect shared buses to individual capacitor cells (tiles). Digital circuits known as strobe generators are used to transform numerical delay commands into strobes that use specific tiles to sample the input and apply the desired delay. In some implementations, tiles are laid out in 2-D arrays. The strobe generators provide bit vectors that identify the row and column of a desired tile, and each tile locally combines its row and column enables with a logical AND operation.

There are two unique aspects of the UABF that complicate the pipeline. First, the profile expresses delays relative to the time of the output sample (output-referred). The delay command is split into fractional delay (FD) and integer delay (ID) components. Unlike in a digital beamformer, FD is performed before ID. The desired delay is known at the time FD is performed, which is at the arrival of the input sample. Because delays vary over time, these input-referred delays are numerically different from the equivalent output-referred delays. But, in order to obtain results equivalent to a digital beamformer, the fractional part of the delay command is converted back to the output-referred representation. Disclosed herein is a method for transforming delay commands for correct results when the sub-sample portion of the delay (fractional delay) is performed before the integer sample portion of the delay, instead of afterwards.

A second aspect of the UABF that can complicate the pipeline is computation of the profile. In some implementations, the chip is made using a 0.18 micron process, which makes digital computations expensive in terms of area and power. Thus, the profile is not computed on-chip. Instead, the profile is delivered through external input/output (I/O). But because of the large data volume (70-90 Gb/s), the profile is compressed off-chip and then decompressed on-chip. This adds two steps (input-referred conversion and compression) to the off-chip part of the pipeline. These steps are then essentially reversed on-chip. A global interface block buffers the inputs and broadcasts them to all 128 channels. Each channel independently reconstructs its slice of the delay and apodization profile, and transforms the delay commands to match the needs of the core. Once the appropriate FD, ID, and apodization values are computed, other on-chip logic generates the strobes for the analog core switches.

According to various implementations, most of the logic is operated at a reduced voltage (1.2 V) to save power. The strobe generators and analog core run on 1.8 V. Level shifters are placed between the I/O's and global interface block, and between the control blocks and strobe generators.

In a conventional beamformer, all the input samples are loaded into a buffer and at the output, the samples are read from the memory and interpolation is used to accomplish the fractional part of the delay. In contrast, in Sampled Analog beamforming, fractional delay is determined at the input, the fractional delay for each sample is performed as the input samples are received, and the output of the fractional delay is stored in a buffer, as discussed above.

In one example, the fractional delay comes first and has a precision of ⅛ of a sample period—3 bits for the fractional delay command, and 8 bits for the integer delay command. In some examples, delay can be up to 192 samples. Thus, there are 11 bits of delay info, and 5 bits of apodization (gain), which results in 16 bits going into every channel for every sample. With 128 channels, at a 40 Mhz sample rate, 16 bits×128 channels×40 MHz sample rate equals 82 Gbits/sec. Transmitting 82 Gbits/sec of information between the control chip and the beamformer uses a high amount of power. Thus, for a low-power system, a compression algorithm is used to compress the data.

In various implementations, a compression algorithm is designed to exploit characteristics of the delay profile. In particular, the design of the compression algorithm depends on the type of data being compressed. Delays vary smoothly over the transducer and slowly over time. In various implementations, the difference in delay from one sample to the next is encoded, and the difference is exploited to generate a spatially smooth polynomial fit. The fit is then re-evaluated. In some examples, every channel in the transducer has information regarding its location on the transducer, and the polynomial fit is evaluated at the specified location.

Apodization is handled by parameterizing a time-varying affine transformation between the transducer element coordinates and the domain of the desired window function (e.g. Hamming). The representation is designed so that reconstruction errors are comparable to the quantization errors inherent in the beamformer architecture. That is, the reconstruction errors are small enough to avoid significant imaging artifacts.

According to various implementations, characteristics of the delay profile are used to design an efficient compression algorithm. In particular, the design of a compression algorithm can exploit prior knowledge about the type of data being compressed. In ultrasound beamforming, delays vary smoothly over the transducer and slowly over time. The encoder encodes the difference in delay from one sample to the next. In some examples, the encoder exploits the spatial smoothness of the delay difference using a polynomial fit. According to various examples, every channel has information about its location on the transducer and evaluates the polynomial fit at that location. In some examples, the polynomial is a fourth order polynomial having five parameters (four polynomial coefficients and a constant). In other examples, the polynomial order may be selected dynamically based on numerical considerations such as fitting accuracy and overflow prevention. Using compression as described herein, the compression ratio is about fifty times. That is, about 1.6 Gb/s of data are sent to the chip as opposed to 82 Gb/s before compression.

According to some implementations, the system has an update period that is the same as the sampling frequency. According to other implementations, the system has an update period that is different from the sampling frequency. A new set of delay and apodization coefficients are determined for each period. In one example, an update period is ten samples (the update rate is 1/10 of the sample rate). In other examples, an update period includes any selected number of samples. The set of polynomial coefficients for the delay and scaling coefficients for the apodization are determined for each period and the coefficients are sent together in one packet to UABF. There are at least eight fixed point values that are transmitted for each update period. Thus, the update period is at least eight cycles. In other examples, the update period is greater than eight cycles, and in one example, the update period is 32 cycles. A longer update period saves power, but provides decreased accuracy. In some implementations, the update period can be pre-set in the system, and in other implementations, the update period can be user-controlled.

Figure 2:
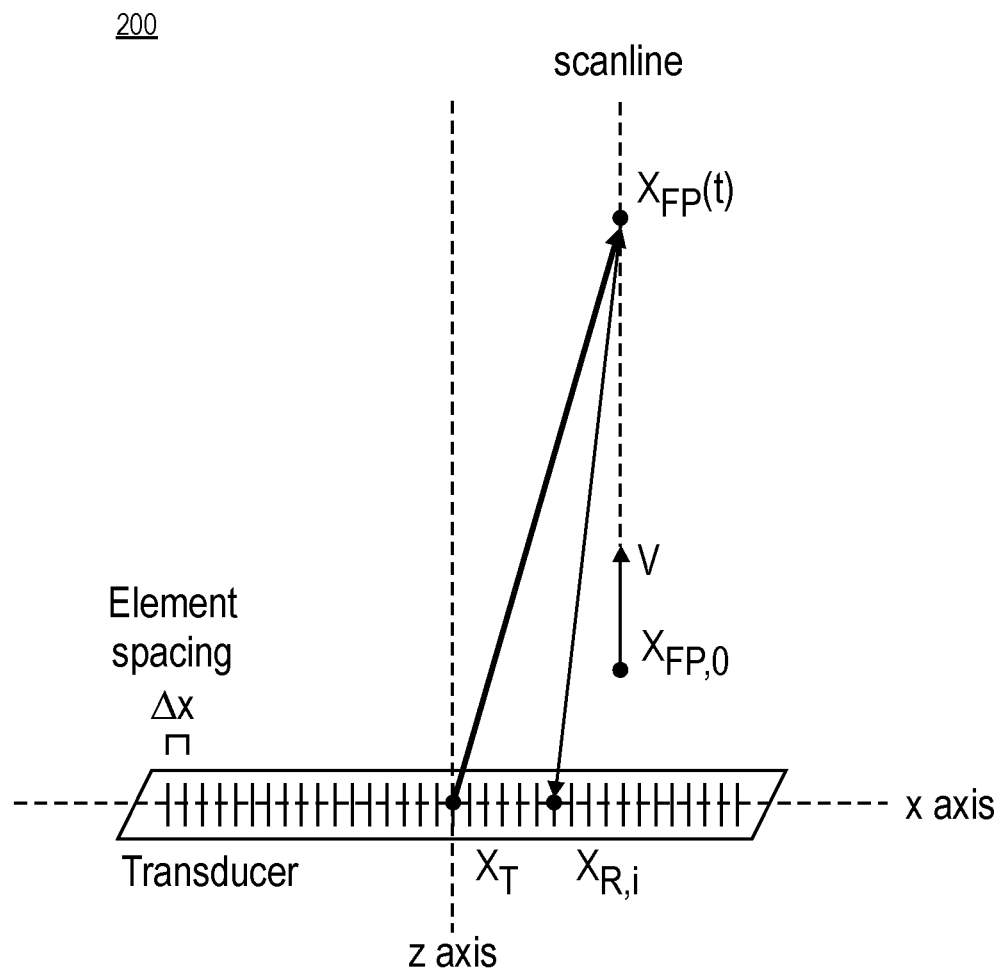
FIG. 2 is a diagram illustrating time-of-flight coordinates, according to some embodiments of the disclosure.

FIG. 2 is a diagram 200 illustrating time-of-flight coordinates, according to some embodiments of the disclosure. Time-of-flight coordinates are used in determining delays. For the purpose of computing delays, the transmit waveform is assumed to be $\delta(t)$ (i.e. an ideal impulse at time 0). Beginning at time 0, samples are received at the input of the beamformer. After time 0, sampling begins at the output of the beamformer. The beamformer output at output sample index n will be:

$$y[n] = y(nT_s) = \Sigma_i A_{ni} x_i(nT_s - \Delta t_{ni}) \quad (1)$$

where i is the index over transducer elements (channels) and $x_i(t)$ is the received signal for channel i. $\Delta t_{ni}$ is the delay for channel i at output sample n. The set of $\Delta t$ values for one scanline is a 2-D array (delay profile). Delay profiles vary for different transducer geometries, imaging modes, configuration parameters, and scanlines within each image.

$A_{ni}$ are the apodization coefficients, which also make up a 2-D array (apodization profile). The choice of aperture and apodization coefficients can be handled separately from the delay profiles. Outside the aperture for a given focal point (where $A_{ni}=0$) the delay is irrelevant. This is helpful for compression since the system is less sensitive to delay errors near the boundaries. Additionally, the system is not sensitive to delay errors outside of the aperture.

The delay for each transducer channel is the difference between the desired output sample time and the time-of-flight from the transmit origin $x_T$ to the focal point $x_{FP}$ and back to the transducer element at $x_{R,i}$. These distances are illustrated in FIG. 2. The delay behavior is most intuitive when the focal point moves at constant velocity v proportional to the output sample rate:

$$x_{FP}(t) = x_{FP,0} + vt \quad (2)$$

where $x_{FP,0}$ is the near end of the scanline and $x_{FP(t)}$ is the focal point at output sample time t. For a radial scanline originating at the middle of the array, v is in the same direction as $x_{FP,0}$. Assuming $x_T=(0,0)$, the outgoing and incoming distances, respectively, are:

$$|x_{FP} - x_T| = |x_{FP,0}| + |v|t \quad (3)$$

$$|x_{R,i} - x_{FP}| = \sqrt{\left(\frac{2i - N_i - 1}{2}\Delta x - (|x_{FP,0}| + |v|t)\cos\theta\right)^2 + ((|x_{FP,0}| + |v|t)\sin\theta)^2} \quad (4)$$

where $\theta$ is the angle between the transducer and the scanline. The x offset from transducer element i to the array center is $$\frac{2i - N_i - 1}{2}\tilde{\Delta}x$$

(elements are numbered left to right). To obtain the delay, we subtract the time-of-flight from the output sample time:

$$\Delta t_{ni} = t - \frac{1}{c}(|x_{FP} - x_T| + |x_{R,i} - x_{FP}|) \quad (5)$$

The independent variable in the delay profile is the output sample time t (which also drives the motion of $x_{FP}$), not the time at which input samples arrive. However, it is possible to convert between these formulations. For a radial scanline, if the focal point moves at half the speed of sound, then the delay at the center of the transducer (assumed to equal the transmit origin) is constant. This comes close to minimizing the overall delay range across the transducer and over time. Thus, in one example, $|v|=c/2$. The delay can be characterized as an absolute delay (i.e., output sampling time minus time-of-flight) or as a relative delay between the transducer elements. Absolute delays can be used to more easily refer each delay to a particular output sample index. In some examples, a global (scalar) offset is applied to the delay profile such that all of the delay commands are positive.

Delay Profiles

The delay for the transducer array varies across transducer elements. In some implementations, the vector of delay values is a state variable that is stored in the beamformer and updated over time. The delay profiles change from the beginning to the end of the scanline. For non-steered scan lines, the delays used in the far field approach a constant. For the steered scan lines, the delays used in the far field approach a line. In some examples, the delay profiles in the near field are parabolic or hyperbolic, with a peak centered on the element closest to the first focal point. This is because the closest element receives reflections earlier and thus requires a longer delay to match the other elements. Delay is a smooth function of both channel index and time.

Apodization Profiles

Apodization coefficients evolve over time to maintain focusing performance throughout the imaging volume. In some implementations, a spatial windowing function is transformed to a time-varying aperture. The aperture is the set of transducer elements for which the apodization coefficient is nonzero, in other words, the active portion of the transducer. Many applications use a constant f-number, in which aperture width is proportional to focal point depth. In general, the f-number is the ratio of the focal length of a camera lens to the diameter of the aperture being used for a particular shot. In one example, the f-number is 1, the first focal point is at a depth of 10λ, and the aperture width at this depth is 10λ. A 10λ aperture is typically 10 elements wide (20 for a phased array). The aperture increases over time. In various examples, the aperture does not expand to cover the entire array before the far end of the scanline. The expansion of the aperture and the amount of the array it covers depends on the f-number, the horizontal offset, and steering. The center of the aperture is set to follow the focal point if it is steered.

In the phased array case, the center of the aperture is not allowed to move outside the edge of the transducer. Not allowing the center of the aperture to move outside the edge of the transducer prevents the apodization coefficients from approaching zero in the far field. Using an f/1.0 or narrower aperture reduces the range of delays from the beamformer, because fewer channels are active when the focal point is in the near field and the delay range would be widest.

In some implementations, the apodization profile has a length equal to the scanline length divided by the focal point velocity, plus the delay range. If the focal point moves at c/2 and the sample rate is $F_s=4F_c$, then one wavelength is covered in 8 sample periods. In various examples, the image covers a depth range of 10λ-300λ, and thus with a maximum delay range of 192 samples, the maximum profile length is 2592 samples. In some examples, the hardware uses 12-bit counters and can extend to 4095 samples.

Output-Referred and Input-Referred Delays

There are two different ways of looking at a given mapping between input samples and output samples. In the following expression, $\Delta[n]$ is an output-referred delay command:

$$y[n]=x[n-\Delta[n]] \quad (6)$$

Thus, to generate the output y at sample n, the value of x at $\Delta[n]$ samples in the past is retrieved. Conversely, this is an input-referred delay command:

$$y[n+\Delta[n]]=x[n] \quad (7)$$

Thus, each sample n in the input x is copied to the output y at $\Delta[n]$ samples in the future.

Both of these formulations represent a delay line. But even if the sequences $\Delta[n]$ are the same, the result of equation (6) and equation (7) will be different because the delay varies over time. The output sample index (the index into y) means something different from the input sample index (the index into x).

In various implementations, the output-referred delay profiles can be converted to input-referred delay profiles using interpolation.

Sequencer to UABF Interface

According to various implementations, the compression of delay and apodization profiles for the UABF, allowing for a simpler and lower power I/O interface, is implemented using a sequencer which is interfaced with the UABF.

As described above, the delay profile is a sequence of delay commands for the channels in the beamformer, computed to achieve dynamic receive focusing along a given scanline. In some examples, the delay commands have ⅛ cycle precision, the beamformer has 128 channels, and there is a delay command for each of the 128 channels in the beamformer. The apodization profile is a sequence of gain commands selected for the desired tradeoff of spatial resolution and sidelobe suppression. In some examples, the gain commands have 5-bit resolution, the beamformer has 128 channels, and there is a gain command for each of the 128 channels in the beamformer.

Due to area and power constraints in traditional systems, the delay and apodization profiles cannot be generated on-the-fly within the UABF. Furthermore, due to the volume of data, it isn't feasible to supply the raw data to the UABF via external interfaces. For example, providing one 11-bit delay command and one 5-bit apodization command for each of 128 channels at 40 MHz totals 82 Gb/s of data. Supplying 82 Gb/s to the UABF significantly drives up power consumption and involves including a serial link IP or a large number of I/O pins. Thus, systems and methods for compressing and decompressing the delay and apodization data are provided.

One implementation described herein provides an encoder (for compression) and a decoder (for decompression). The combined encoder and decoder ("codec") conveys the delay and apodization profiles while maintaining the quality of the ultrasound images. The decoder is part of the UABF chip.

According to one implementation, the design uses 36 I/O pins that operate synchronously with the sampling clock (i.e. 40 MHz), providing an approximately a fifty times compression ratio. Each scanline uses about 10 kB of compressed data in total (so a 128-line image sequence is 1.2 MB). The I/O breakdown is described in more detail below.

A profile is generated for each scanline. Each image is generated from a group of scanlines. The scanline group is created with a consistent configuration of transducer and beamformer parameters, referred to herein as an imaging scenario. The technique defined herein can be used in many imaging scenarios. Some exemplary imaging scenarios include:
1. Linear array (10 MHz, 128 elements, λ spacing)
   (a) Rectangular image; 128 scanlines
   (b) Skewed rectangular image (20° steering); 128 scanlines
2. Curvilinear array (5 MHz, 105 elements, λ spacing)
   (a) Sector image (±25°, matching the curvature of the transducer); 105 scanlines
3. Phased array (2 MHz, 80 elements, λ/2 spacing)
   (a) Sector image (±45°); 128 scanlines
   (b) Rectangular image; 80 scanlines In one example, reconstruction accuracy is typically ±1/16 cycles for the delay and ±1/32 for the apodization coefficients. These errors are equivalent to ±½ LSB given the quantization of those commands within the UABF.

According to various implementations, the codec handles delays and apodization separately. Separate handling of delays and apodizations simplifies the UABF control logic, and allows the delay profile to be converted to input-referred form before compression. (An input-referred delay command tells the delay line "how far in the future" to store each input sample, whereas an output-referred delay command tells the delay line "how far in the past" to retrieve each output sample.) Apodization is performed at the output of the delay line, so it remains output-referred. Thus, the delay and apodization profiles, as handled by the codec, are out of sync with each other.

Another benefit of the codec handling delay and apodization profiles separately is that various delay and apodization profiles have different shapes, numerical ranges, and accuracy requirements.

Delay Representation

The desired delays are computed geometrically. Delays are the difference between sampling time and 2-way time-of-flight to the moving focal point. Delays vary slowly over time and across the transducer. The variation along both axes is largest in the near field.

The finite delay ring imposes a minimum and maximum achievable delay. According to one implementation, the design has a 192-element delay ring. In one example, the minimum integer delay is 4 samples, due to the latency of the 5-tap FIR filters in the Farrow structure. The maximum integer delay is 191 samples, since, in any given cycle, the input is sampled from a different tile than the output delivered. Given the minimum and maximum integer delays, the delay range including fractional delays, is 3.5 (ID 4, FD −0.5) to 191.375 (ID 191, FD +0.375). In some examples, the system is limited to delay limits of 4.0 to 191.0 so that errors from the codec do not push delays out of range. Thus, in various examples, the practically achievable delay range is 187 samples. According to various implementations, the length of the delay range is the length of the delay ring minus 5 samples.

According to various implementations, before compression, the delays are clipped to avoid wraparound. Clipping is achieved by offsetting the profile so that the maximum delay equals the maximum supported delay, and then removing elements from the aperture where the delay is less than the minimum supported delay. This can narrow the aperture at the beginning of a scanline (if the f-number is low and the aperture expands rapidly), and in some cases it also reduces the number of channels that can be used in the far field. The smooth nature of the delay profile (in both time and space) provides many opportunities for compression. The algorithms are designed to prioritize circuit area and power and make the channels as independent as possible. To make the channels more independent, communication between channels is minimized. In some examples, the algorithms prioritize circuit area and power primarily in the decoder.

According to various implementations, the delay command for channel i at output sample index n is $\Delta t_i[n]$. A low-order polynomial is fit to the time difference in delay across the transducer according to the following equation:

$$\Delta t_i[n+1] - \Delta t_i[n] \approx \sum_{k=0}^{K} a_{nk} x_i^k \tag{8}$$

where $x_i$ is the coordinate of transducer element i. The coefficients $a_{nk}$ are estimated with a least-squares fit. These coefficients are independent of the channel index i. According to various examples, the same set of coefficients is used for each channel.

According to various implementations, the temporal differences between delay commands (less than 1 sample) are smaller than the delay commands themselves (on the order of 100 samples), so this approach is tolerant of relative errors. However, the errors accumulate over time since the reconstructed delay command is a cumulative sum. The decoder stores delay commands with higher precision than the delay line accepts. One implementation uses 11 fractional bits, and the delay line accepts 3 fractional bits. In some implementations, internal numerical formats are selected to use as few bits as possible without introducing unacceptable errors. In some examples, the polynomial is not updated on every cycle, which reduces bandwidth and decoder area. During each update interval, the reconstructed time differences remain constant. In various examples, an update interval is multiple cycles long. Thus, the delay command for each channel is piecewise linear, though each channel has its own slope. If the update period for the polynomial is $T_p$ cycles, then the notation for this is:

$$\Delta t_i[n+1] - \Delta t_i[n] \approx \sum_{k=0}^{K} a_{pk} x_i^k \tag{9}$$

$$p = \left\lfloor \frac{n}{T_p} \right\rfloor \tag{10}$$

The length of the update interval can be adjusted to trade between power consumption and accuracy. Furthermore, if the polynomial is evaluated by a single multiplier computing one product per cycle, which saves area, the update interval exceeds the order of the polynomial. Multiplication and addition can be performed in the same cycle without violating timing constraints. (If the multiplication and addition are performed in different cycles, the update interval is at least twice the order of the polynomial). The coefficients are jointly fit to the delay differences within each update interval.

In various implementations, the x-coordinate of each transducer element is stored in a register that is programmed using the SPI interface. In some examples, the coordinate is not the exact position of the element (in meters); any static warping of the coordinate scale can be used. This can benefit the accuracy of a low-order fit, especially for curvilinear transducers.

With this encoding, errors in delay accumulate over time. Accumulated error is minimized by storing the first sample at which each channel is active (within the aperture) and the "initial" value of the delay at that time. The decoder waits for the channel to become active before changing the delay.

When performing the polynomial fit, the transducer elements that are active (within the aperture) during the update interval are considered. This reduces the error for the active elements and increases the error for the inactive elements. However, the delay errors for the inactive elements are reset to zero when the (exact) initial value is loaded. In one example, the delay differences are fitted with a 4th order polynomial and are updated every 8 cycles. In this example, the delay error is within ±1/16 of a sample period. Each channel accumulates most of its error in the near field, and then the error stabilizes.

The target delay profile is not exactly described by a low-order polynomial. The accuracy of this approach depends on how much of the target delay profile is contained in higher-order terms. The most difficult delay profiles come from curvilinear and phased arrays.

To bring the error within 1/16 sample periods, the variation in the delay profile (and the error) can be used, and in particular, the slow variation over time in the delay profile. A small "correction" term is defined, that is specified for each channel (in order to tackle higher-order terms), but updated infrequently. The corrections are transmitted serially. For example, the corrections for a 128-element transducer are updated every 128 cycles. With a correction update period of $T_c$, the delay difference is approximated by $$\Delta t_i[n+1] - \Delta t_i[n] \approx \sum_{k=0}^{K} a_{pk} x_i^k + c_{im} \tag{11}$$

$$p = \left\lfloor \frac{n}{T_p} \right\rfloor \tag{12}$$

$$m = \left\lfloor \frac{n}{T_c} \right\rfloor \tag{13}$$

where the correction $c_{im}$ is specified separately for each channel i and update interval m. $T_c$ is larger than $T_p$. The polynomial is updated more frequently than the corrections.

The result of applying the corrections of equation (11) to the profile is that each channel's delay error is driven to zero over time, instead of stabilizing as the profile becomes smoother. (The "window" of residual errors depends on the update rate and the LSB size of the correction.) There are still some error spikes in the near field because the corrections aren't changing quickly enough to capture the changes in error.

Apodization Representation

The apodization command $a_i[n]$ only has a few parameters, but may not be smooth in time and space. In various implementations, the profile generator supports at least Hanning, Hamming, and rectangular windows with constant aperture or constant f-number. The Hamming and rectangular windows have a discontinuity at the edge of the aperture (as it expands outwards). Outside the aperture, the apodization command is zero. Within the aperture, any "raised cosine" window function can be expressed as:

$$a_i[n] = (1 - \alpha) + \alpha \cos(\pi x_{si}[n]) \tag{14}$$

$$x_{si}[n] = \frac{2}{W[n]} (x_i - x_0[n]) \tag{15}$$

where $\alpha=0$ for a rectangular window, $\alpha=0.46$ for a Hamming window, and $\alpha=0.5$ for a Hanning window.

The scaled x-coordinate $x_{si}[n]$ accounts for the changing width and horizontal motion of the aperture (following the focal point). The aperture at sample n includes channels for which $-1 < x_{si}[n] < 1$. W[n] is the width of the aperture. In some examples, the apodization decoder uses a cosine lookup table, which has a relatively small area overhead but improves accuracy over quadratic fitting. It seems sensible to evaluate the apodization profile directly by specifying the type of window (in terms of $\alpha$), along with its center position $x_0[n]$ and width scale 2/W[n] as a function of time. One difficulty with that approach is evaluating cos(x). According to some examples, 5-bit accuracy is sufficient for apodization commands, so the cosine is evaluated using a 64-entry lookup table. The lookup table has 64 entries rather than 32 because the slope of the cosine is small near x=0 and larger near $x=\pi/2$. As in the delay decoder, the apodization decoder updates the fitting parameters at a limited rate (e.g. every $T_a$ cycles) to reduce bandwidth:

$$x_{si}[n] = \frac{2}{W_m} (x_i - x_{m,0}) \tag{16}$$

$$m = \left\lfloor \frac{n}{T_a} \right\rfloor \tag{17}$$

When the parameters are updated infrequently, errors are reduced by making them piecewise linear functions of time (instead of holding them constant between updates). The decoder stores the current value of $x_0[n]$ and 2/W[n] and accumulates temporal differences that it receives every $T_a$ cycles from the sequencer. This is similar to the delay command, which is updated every cycle even though the polynomial fit is updated every $T_P$ cycles.

Under this scheme, the apodization decoder uses two multiplications per update per channel: computing the scaled x-coordinate and multiplying by $\alpha$. In one implementation, the apodization fit shares a single multiplier with the delay decoder, and the updates are synchronized ($T_P=T_a$) although the calculations are independent. Reconstructed apodization values are warped (predistorted) to compensate for the nonlinear transfer function of the capacitive apodization DAC.

Hardware Architecture

Figure 3:
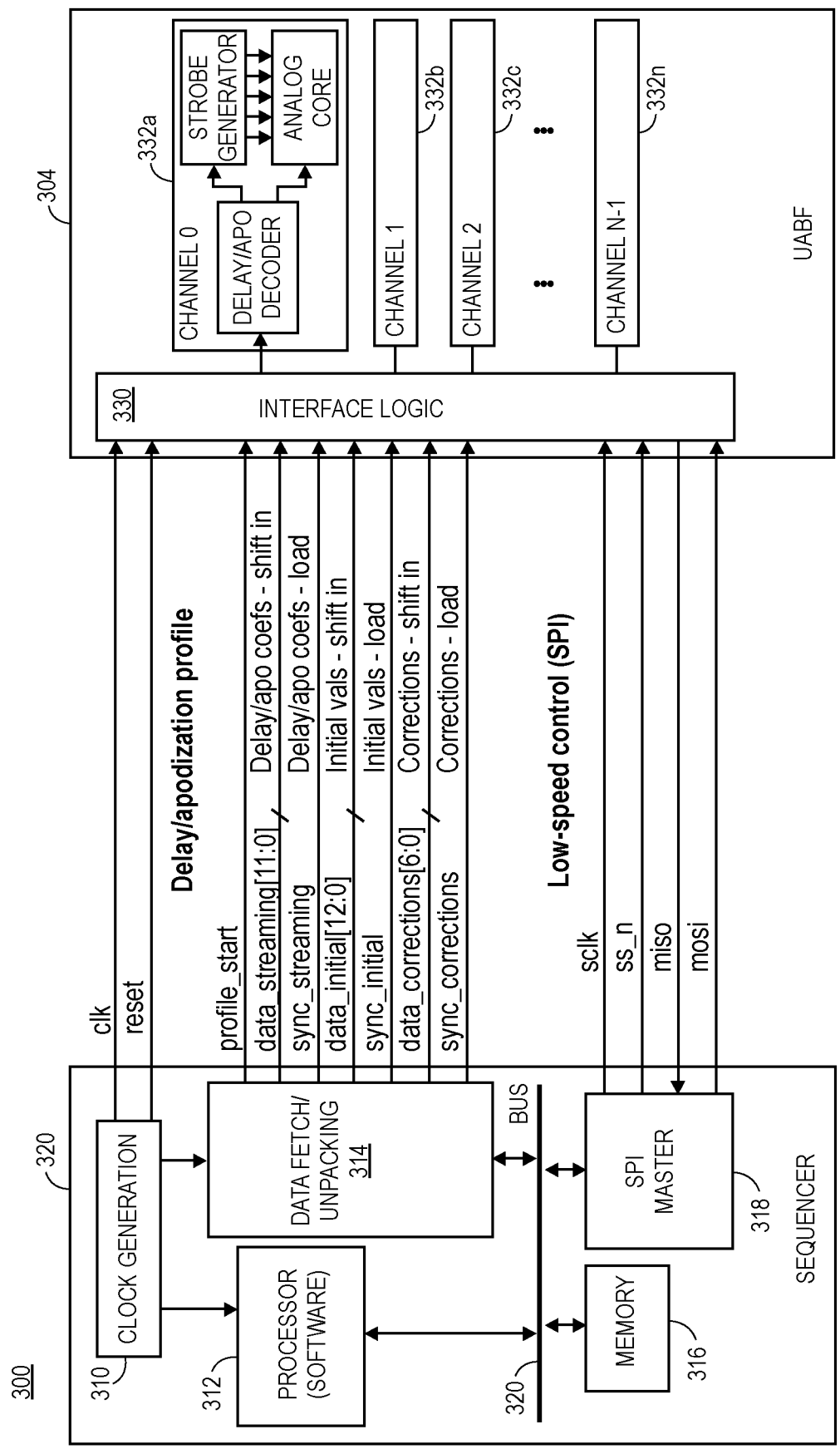
FIG. 3 is a diagram illustrating the connections between a sequencer and an ultrasound analog beamformer, according to some embodiments of the disclosure.

FIG. 3 is a diagram 300 illustrating the connections between a sequencer 302 and an ultrasound analog beamformer 304, according to some embodiments of the disclosure. The sequencer 302 includes a clock 310, a processor 312, a data fetch/unpacking module 314, a memory 316, an SPI master module 318, and a bus 320. The ultrasound analog beamformer 304 includes interface logic 330, and multiple channel modules 332a-332n. Each channel 332a-332n includes a delay/apodization decoder, a strobe generator, and an analog core. According to one example, there are about 42 connections between the sequencer 302 and the ultrasound analog beamformer 304. In other implementations, there are fewer than about 42 connections between the sequencer 302 and the ultrasound analog beamformer 304 or more than about 42 connections between the sequencer 302 and the ultrasound analog beamformer 304.

According to various implementations, the clock 310 of the sequencer 302 outputs a clk signal and a reset signal to the interface logic 330 of the ultrasound analog beamformer 304.

The sequencer 302 outputs a delay/apodization profile to the ultrasound analog beamformer 304. In some examples, the data fetch/unpacking module 314 of the sequencer 302 outputs the delay/apodization profile to the interface logic 330 of the ultrasound analog beamformer 304. In some implementations, the delay/apodization profile is conveyed by a 36-bit parallel interface. The interface is single-ended and synchronous with the sampling clock clk. After a pulse on profile_start, time-dependent delay and apodization parameters are shifted into registers that are wider than the data buses. The *_sync signals load the current shift register contents into global registers (some of which may be replicated for each channel). The frequency of sync pulses determines the update rate for each profile component. The static parameters (e.g. initial delays) for the next scanline are streamed in using the data_initial and sync_initial lines during operation, in order to reduce the dead time between pulses.

The SPI master module 318 also communicates with the interface logic 330. In particular, the SPI master module 318 supplies static configuration values (such as the transducer element x-coordinates) to the interface logic 330. In some implementations, the SPI interface runs at a lower frequency than the sampling clock.

Figure 4:
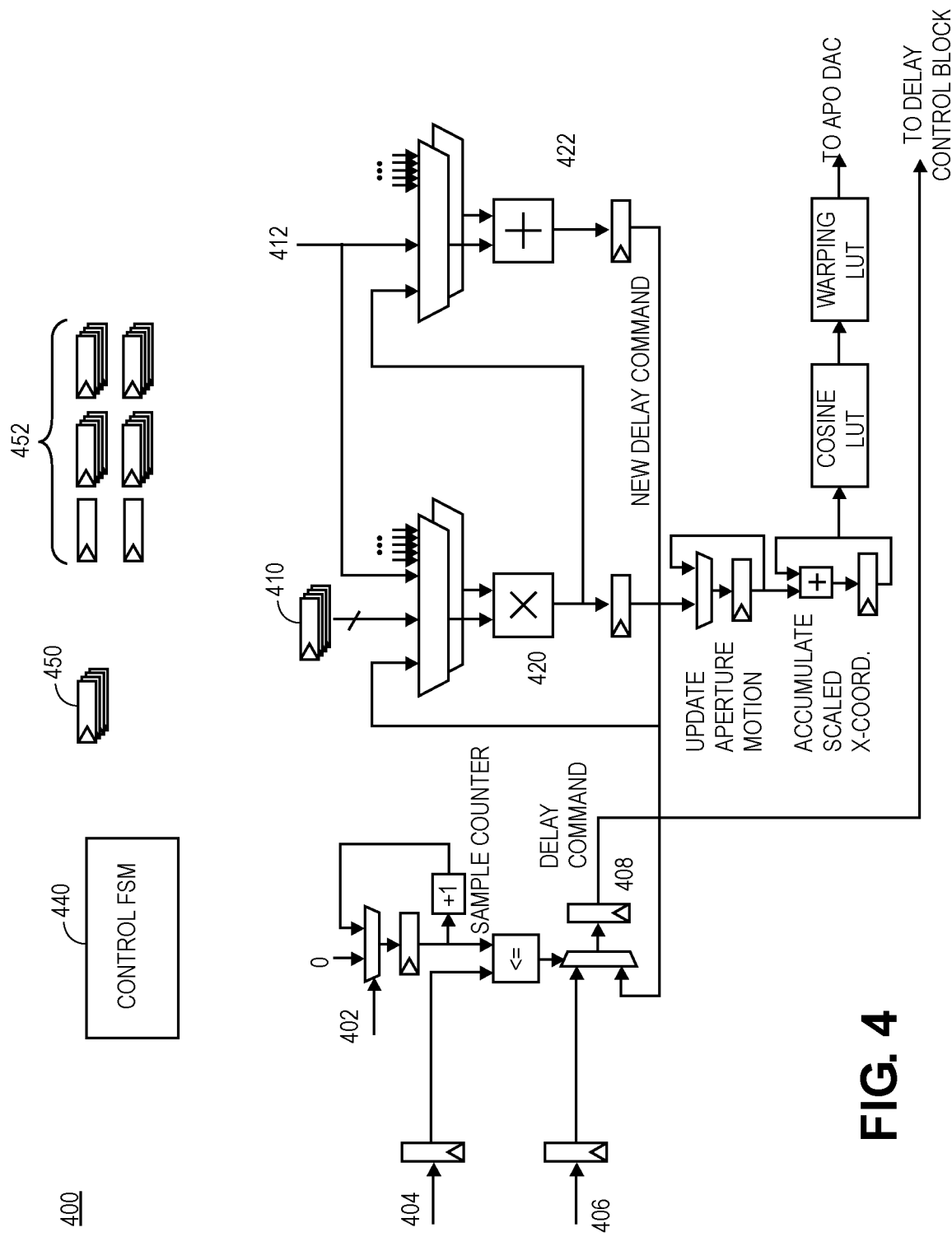
FIG. 4 is a diagram illustrating decompression (decoder) logic, according to some embodiments of the disclosure.

FIG. 4 is a diagram illustrating logic for a decoder 400, according to some embodiments of the disclosure. FIG. 4 shows the main architectural elements of the decoder 400 for one channel. According to various implementations, the decoder 400 of FIG. 4 is included in the decoders in each of the channels 332a-332n of the ultrasound analog beamformer 304 shown in FIG. 3. The decoder 400 receives inputs from interface logic, such as interface logic 330 of FIG. 3. In particular, inputs to the decoder 400 include a profile_start signal 402, a delay initial time signal 404, and a delay initial value signal 406. The profile_start signal 402, delay initial time signal 404, and delay initial value signal 406 are used to generate a delay command signal 408. The decoder 400 also receives as input polynomial coefficients 410 and an x-coordinate 412. The decoder 400 has a profile decompression block that uses a single fixed-point multiplier 420 per channel. In one example, the fixed-point multiplier 420 is a 12×12 bit multiplier. The decoder 400 also uses a fixed-point adder 422. In one example, the fixed-point adder 422 is a 12 bit adder. According to various implementations, the decoder 400 uses resource sharing to reduce area. The decoder 400 outputs signals to a delay control block, and to an apodization DAC.

The decoder 400 also includes a control finite state machine (FSM) 440, and multiple apodization registers 450. According to various examples, the apodization registers 450 store quantities that specify the motion of the center coordinate and changes in the width scale of the aperture. The decoder 400 may also include other intermediate result registers 452.

In one example, one multiplier 420 and one adder 422 are shared between delay and apodization decoders, using input and output multiplexers controlled by the FSM 440. The logic in FIG. 4 to the left of the multiplier 420 handles initialization of the delay command to the pre-programmed initial value at the proper time.

According to various implementations, a 4th order polynomial fit is used. Delay and apodization fits are updated synchronously every 10 cycles. Most numerical values in the delay fitting process are in 12-bit format. In one example, most numerical values in the delay fitting process are Q2.10 signed format. In some implementations, the apodization output has 5 bits of precision. In various examples, more than 5 bits of precision are used internally, before warping.

Delay Line Control

Figure 5:
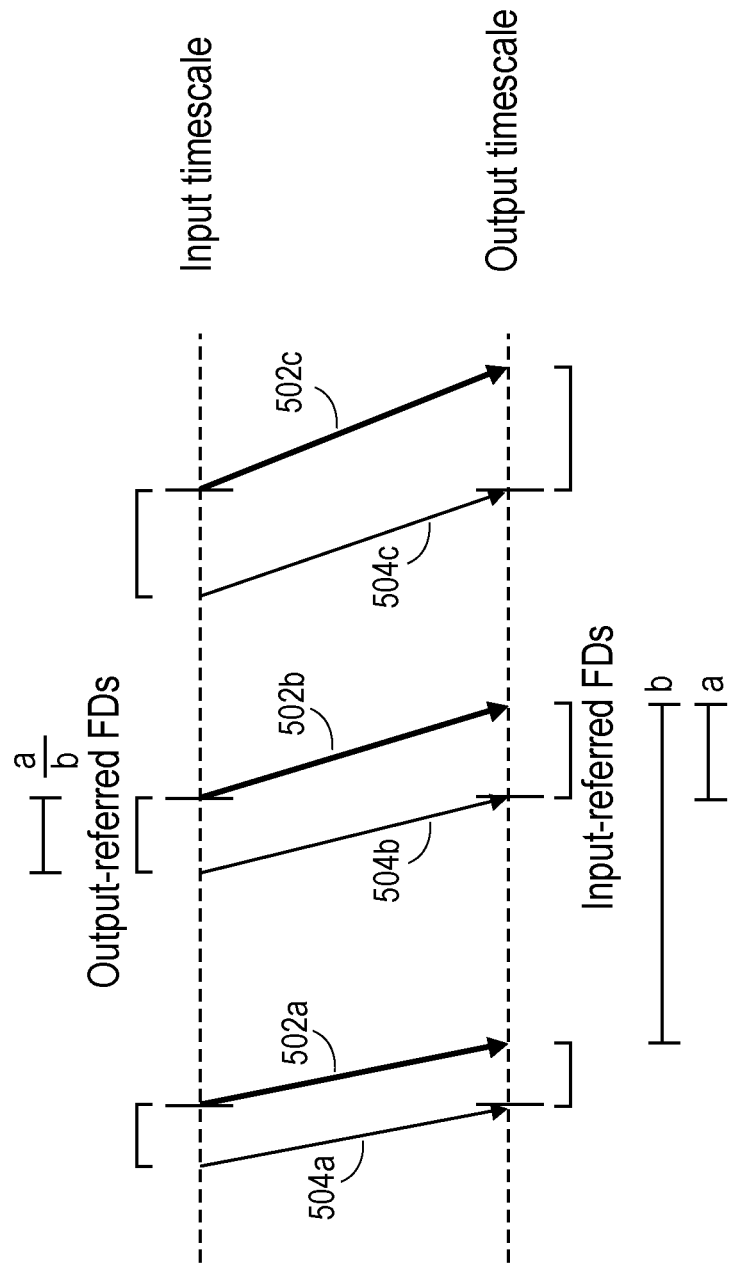
FIG. 5 is a diagram illustrating the transformation from output-referred to input-referred fractional delays, according to some embodiments of the disclosure.

FIG. 5 is a diagram 500 illustrating fractional delays, according to some embodiments of the disclosure. The fractional delays include input-referred delays 502a-502c and output-referred delays 504a-504c One of the outputs from the decompression block is an input-referred delay command. For each input sample, the amount of time to delay the sample before output is specified. But the delay command is not used directly to control the delay line. During each cycle, the strobe generator (described below) uses input sampling information, fractional delay information, and output sampling information to drive the Farrow structure and delay ring.

In various examples, input sampling information used by the strobe generator may include information about which tile (index) of the delay ring the input voltage is stored on. The fractional delay information used by the strobe generator may include information about the latency of the Farrow structure, such as which tile sampled the input in a previous cycle. For example, the strobe generator may use information about which tile the input was sampled on three cycles ago. In some examples, the strobe generator uses information regarding what fractional delay command to apply to an input sample. The output sampling information used by the strobe generator includes which tile to sample the output charge from.

In various implementations, there are many potential variations in the delay line. In one example, the output tile order is fixed and the input tile order can be varied on a per-channel basis. In another example, the input tile order is fixed and the output tile order is varied. In some implementations, fixing the output tile order and varying the input tile order minimizes the amount of memory used. In one implementation, the output tile is rotated around the delay ring sequentially starting from 0 at the beginning of the scanline. Each channel's input tile is initialized to the initial integer delay (ID). If at time 0 the input is sampled onto tile k, that tile will be used to output k samples later since the output was counting from tile 0. The input tile index is then incremented to track changes in the ID command. If ID command does not change, the tile index will increment by one. If the ID command increases, the tile index will increment by two. If the ID command decreases, the tile index will stay the same. According to some implementations, the architecture limits the amount the ID command can change from one cycle to the next. In one example, the ID command can only change by one or by less than one, from one cycle to the next.

FIG. 5 shows the interpolation scheme used to recover output-referred fractional delay (FD) commands from the decompressed (input-referred) delay sequence. In one examples, the IDs are zero, and the input-referred fractional delay arrows 502a-502c (originating at the sample times) represent input-referred FDs. The output-referred fractional delay arrows 504a-504c (ending at the sample times) represent output-referred FDs. Because the delay is time-varying, input-referred and output-referred FDs are not equal. However, we can approximate the output-referred FD by linear interpolation. The length of time marked b in the diagram 500 is the output time between two input samples. Note that on the input timescale these samples are one cycle apart, but on the output timescale they are b cycles apart. The length of time marked a is the input-referred FD of the second input sample. We can rescale a to the output timescale by dividing it by b. Thus a/b is the output-referred FD of the second sample. FD commands from this interpolation algorithm provide correct results with the architecture described herein.

Figure 6:
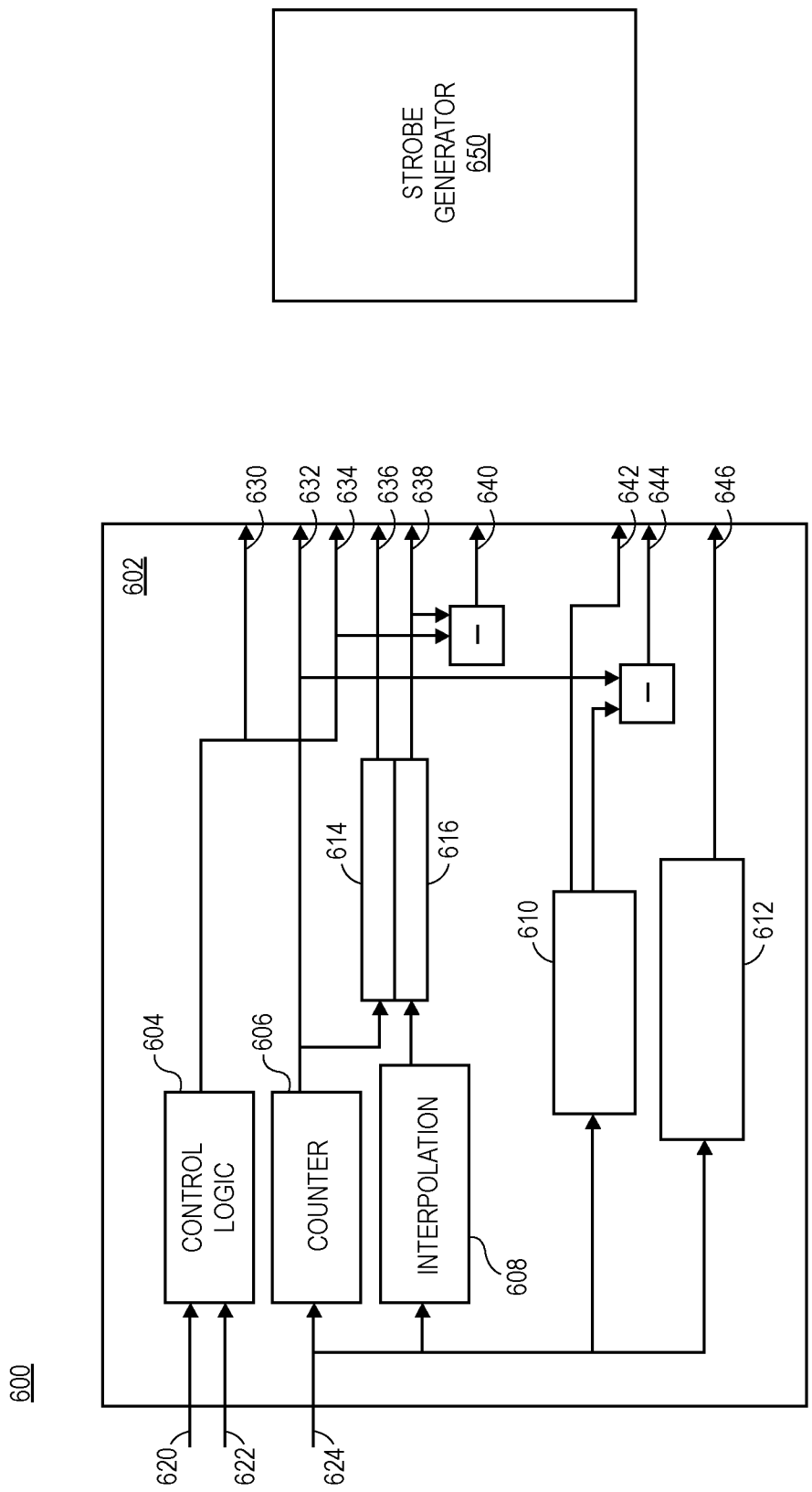
FIG. 6 is a diagram illustrating a delay control block, according to some embodiments of the disclosure.

FIG. 6 is a diagram 600 illustrating a delay control block 602, according to some embodiments of the disclosure. The diagram 600 shows the connections between the delay control block 602 and the strobe generator 650. The delay control block 602 includes control logic 604, a counter 606, a first interpolation module 608, a control/counter module 610, a second interpolation module 612, first delay module 614, and a second delay module 616. Inputs 620, 622, and 624 are output from the decompression block (decoder). In one example, the first input 620 is a delay_apo_valid input and the second input 622 is a delay_ir_active input, and the first 620 and second 622 inputs are input to a control logic block 604. The third input 624 is a delay [20:0] input and is input to the counter 606, the first 608 and second 612 interpolation modules, and the control/counter module 610.

According to one implementation, output 632 is a pri_ring_index [7:0] output, and the output 632 selects the delay tile for input sampling. This is delayed by 3 cycles to generate output 636, which is the pri_fd_index [7:0] output. Output 636 selects the delay tile for Farrow structure output (the delay is included because the Farrow structure has a 3 cycle latency). The FD ring index is subtracted from the input ring index to generate an offset 640, where the offset 640 is the pri_fd_ring_offset [2:0].

The outputs 630, 632, 634, 636, 638, 640, 642, 644, and 646 are output to the strobe generator 650. According to various implementations, within the strobe generator 650, the offset 640 is added back to the output 632, the pri_ring_index [7:0]. According to various implementations, the design described above reduces the number of interface wires (and hence level shifters) by 5.

In various implementations, the outputs 630, 632, 634, 636, 638 are baseline strobe generator control signals. The output 640 a first transformation. An offset is transmitted to reduce the number of control signals. The outputs 642, 644, 646 are a second transformation, and are used to compute a secondary fractional delay and indicate to the strobe generator 650 which delay tile is to receive the secondary FD.

Figure 7:
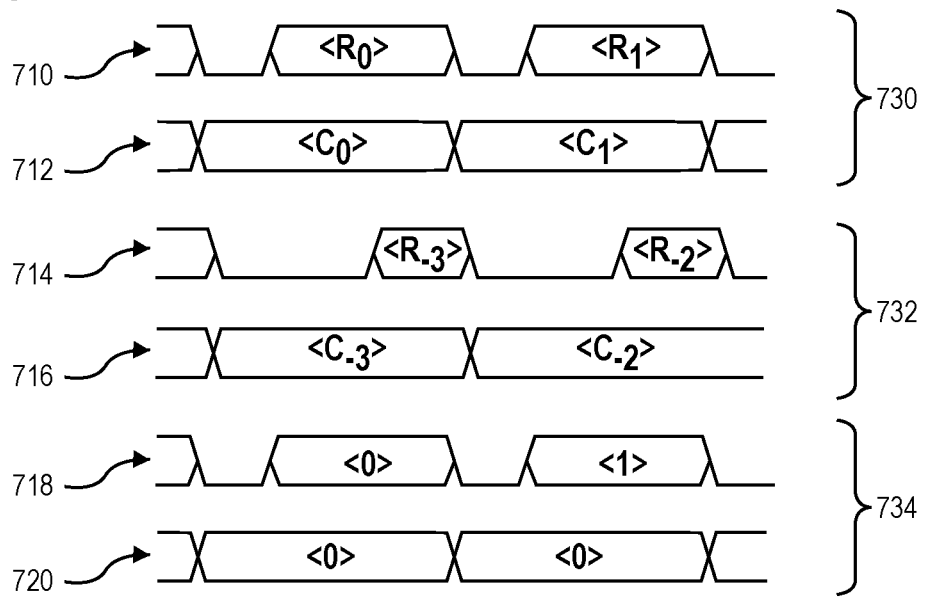
FIG. 7 is a diagram illustrating the clock phases used within the beamformer and the strobes derived from those clock phases, according to some embodiments of the disclosure.

FIG. 7 is a diagram 700 illustrating the non-overlapping clock phases used in the switched-capacitor core of the beamformer, as well as the strobes (switch control signals) used to control switches with various functions, according to some embodiments of the disclosure. The first clock phase (not shown) is used to reset internal nodes to a known voltage. The second clock phase 702, spans the majority of the sample clock period. In some examples, the second clock phase 702 is used to sample the input waveform. The second clock phase 702 is further subdivided into third clock phase 704 and fourth clock phase 706. The third clock phase 704 enables internal charge-sharing operations such as apodization, and the fourth clock phase 706 enables the charge-sharing operations that perform apodization, compute fractional delays, and sum the channels at the beamformer output. There is no overlap between the first clock phase and the third 704 and fourth 706 clock phases.

A second modification shown in FIG. 6 assists the UABF in handling time-varying delays. When the delay command is constant, one delay tile is used per cycle. However, especially in the near field, the delay command increases. When the ID command increases, one of the tiles is skipped—no input charge is sampled onto it. The skip causes a glitch to appear at the output later when the skipped tile is selected. The skipped tile occurs because the reference profile calls for two output samples to be derived from the same input sample (with different FD values), but there is one Farrow structure with which to perform FD. To mitigate this problem, the digital logic has the capability to sample the input onto two different tiles within a cycle, with no change to the analog core circuit. If configured (via SPI), the primary input is sampled using the fourth clock phase 706 and the secondary input is sampled using the third clock phase 704. According to some examples, the third clock phase 704 is short, so the tile voltage does not accurately settle to the input. Furthermore, the proper fractional delay is not computed. Instead, the time between clock phases is used for FD. This ensures that the output at least approximates the desired sequence, reducing the magnitude of the glitches. According to various implementations, using the systems and methods described herein improves image quality in the near field.

Strobe Generators

Figure 8:
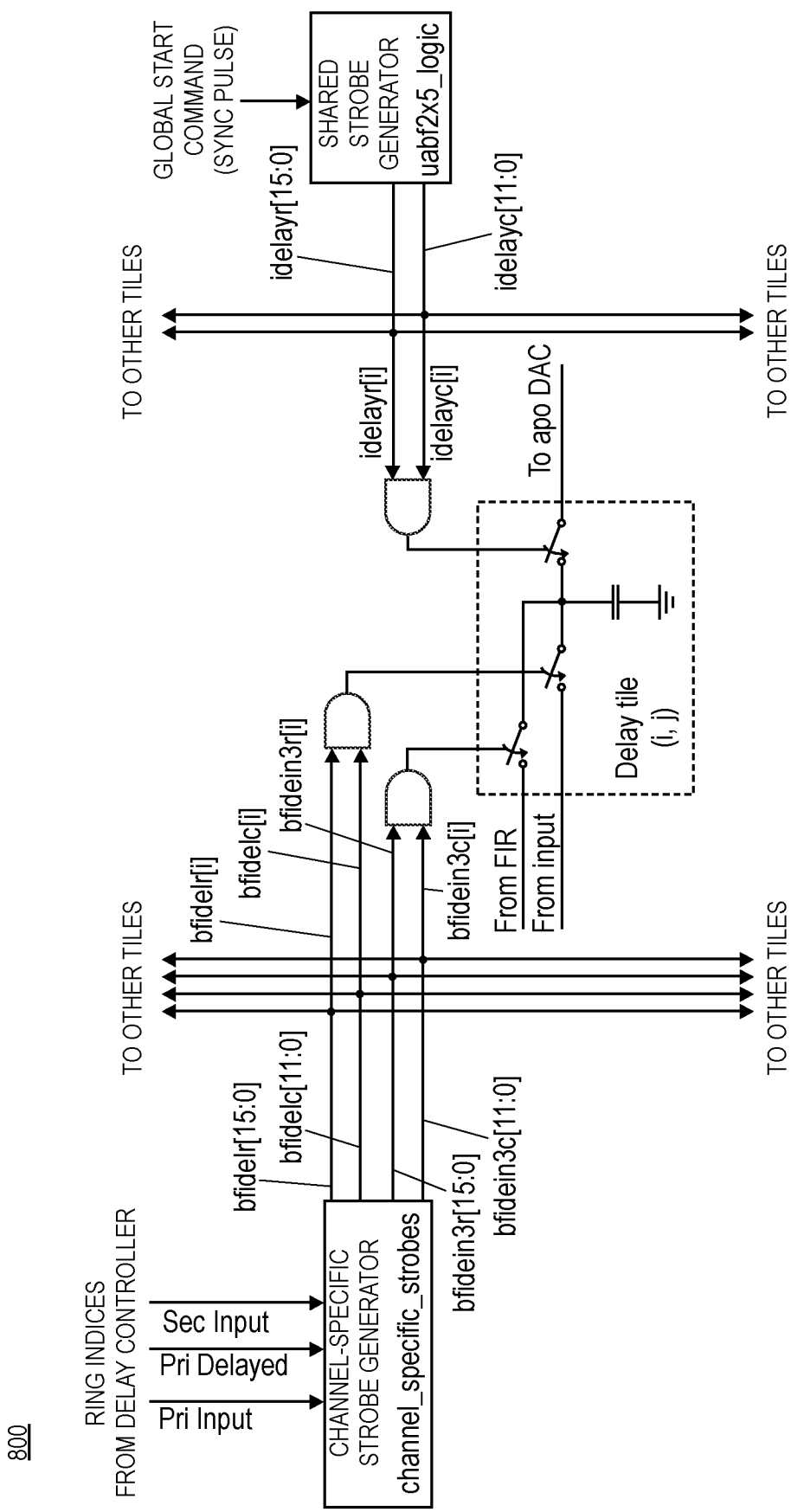
FIG. 8 is a diagram illustrating a connection between strobe generators and a delay ring, according to some embodiments of the disclosure.

FIG. 8 is a diagram 800 illustrating a connection between strobe generators 802 and a delay ring 804, according to some embodiments of the disclosure. The strobe generators 802 are circuits generating the key gate drive signals for the switched-capacitors in the analog core. Some of the signals are manipulated further by logic within the core. The delay ring 804 sampling signals are described here. According to one implementation, the delay ring is organized as 16 rows of 12 columns, for a total of 192 tiles. Each delay tile capacitor has three ports which correspond to the strobe signals illustrated by FIG. 7:

1. The first port is used to sample the input, and includes first row select line 710 and first column select line 712. In some examples, the first port selects the delay tile for input sampling. In one example, the first port is a bfidel port, and the first row select line is bfidelr<15:0> and the first column select line is bfidelc<11:0>.
2. The second port is used to charge-share selected FIR filter taps with the input from 3 cycles in the past, thus forming the output of the Farrow structure, and includes second row select line 714 and second column select line 716. In some examples, the second port selects the delay tile for fractional delay computation. In one example, the second port is a bfideln3 port and the second row select line is bfideln3r<15:0> and the second column select line is bfideln3c<11:0>.
3. The third port is used to sample the output, and includes third row select line 718 and third column select line 720. In some examples, the third port selects delay tiles for output sampling. In one example, the third port is an idelay port, and the third row select line is idelayr<15:0> and the third column select line is idelayc<11:0>.

FIG. 8 shows the connection of the strobe generators 802 to the delay ring 804. Each of the three ports is accessed by row and column select lines. According to various implementations, the idelay port is sampled identically across all channels, so it is driven by a separate strobe generator 806 that is shared within groups of 4 channels.

Figure 9:
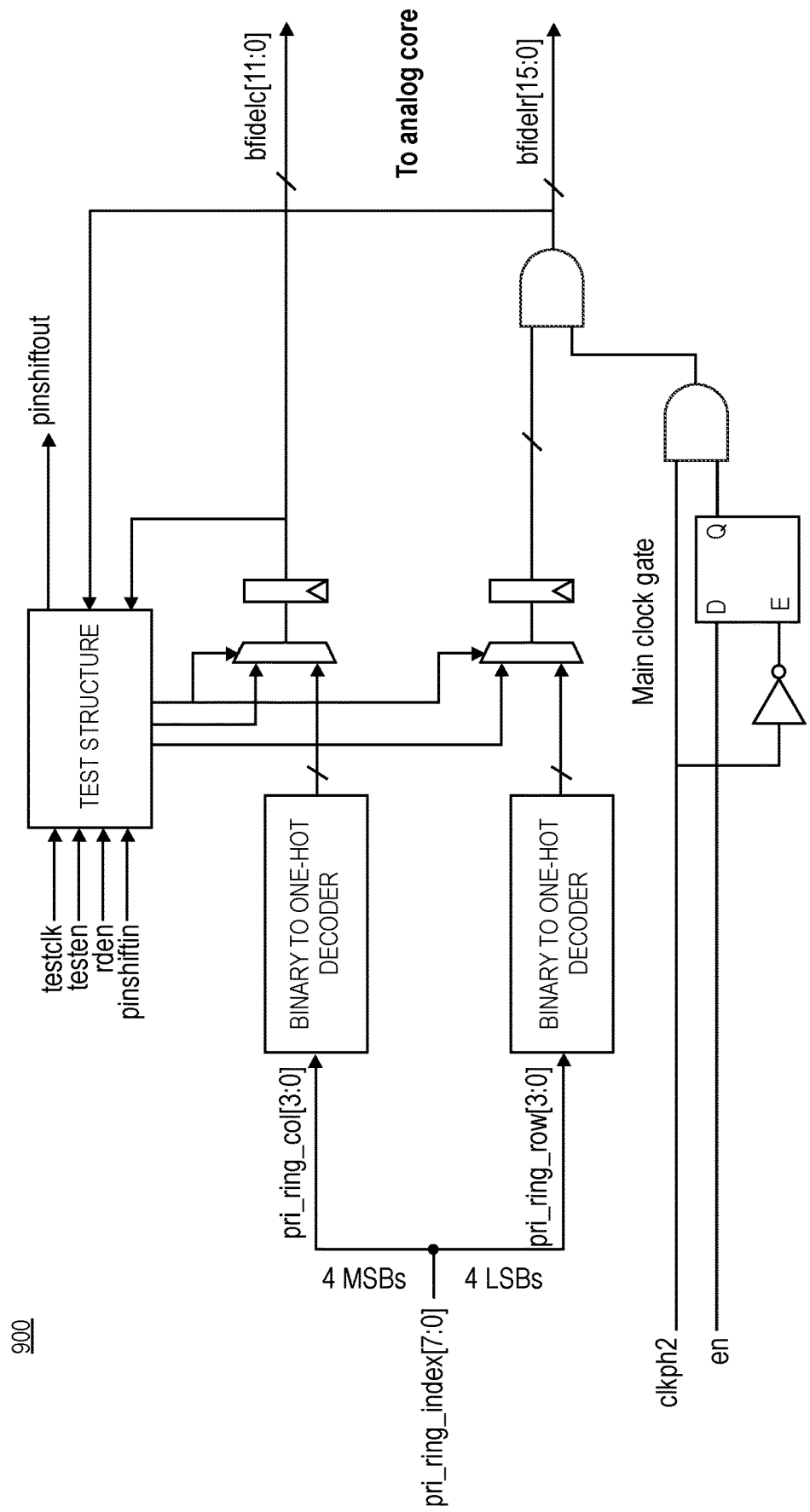
FIG. 9 is a diagram illustrating strobe generator architecture, according to some embodiments of the disclosure.

FIG. 9 is a diagram illustrating a strobe generator architecture 900, according to some embodiments of the disclosure. FIG. 9 shows the portion of the channel-specific strobe generator 802 logic that drives the first port of the delay ring. In various examples, the circuits that drive the second and third ports are nearly identical. The binary ring index from the delay control block is input at 902, and is split into column 904 and row 906 indices (following column-major order). In one example, the column indices are the most significant bits and the row indices are the least significant bits. Binary to one-hot decoders 914 and 916 convert the indices into strobes that are active for at most one row and column at a time. The row strobes are ANDed with the clock so that the switch control for the selected tile is a well-defined pulse aligned with the second clock phase 926. Column strobes are not ANDed with the clock because the row and column strobes are ANDed within the tile. Furthermore, the clock input is gated by a channel-wide enable signal to save power when the channel is unused.

Figure 10:
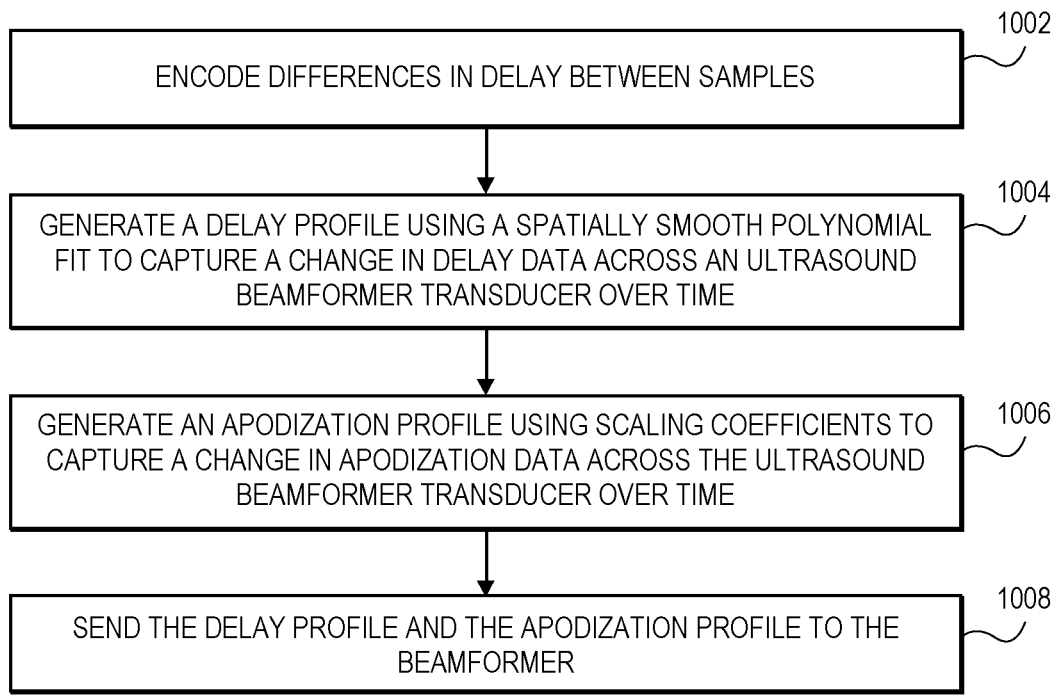
FIG. 10 is a flow chart showing a method for compressing data in an ultrasound beamformer, according to some embodiments of the disclosure.

FIG. 10 is a flow chart showing a method 1000 for compressing data in an ultrasound beamformer. At step 1002, differences in delay between samples are encoded. At step 1004, a delay profile is generated using a spatially smooth polynomial fit to capture a change in delay across an ultrasound beamformer transducer over time. At step 1006, an apodization profile is generated using scaling coefficients to capture a change in apodization data across the ultrasound beamformer transducer over time. At step 1008, the delay profile and the apodization profile are sent to the beamformer.

Figure 11:
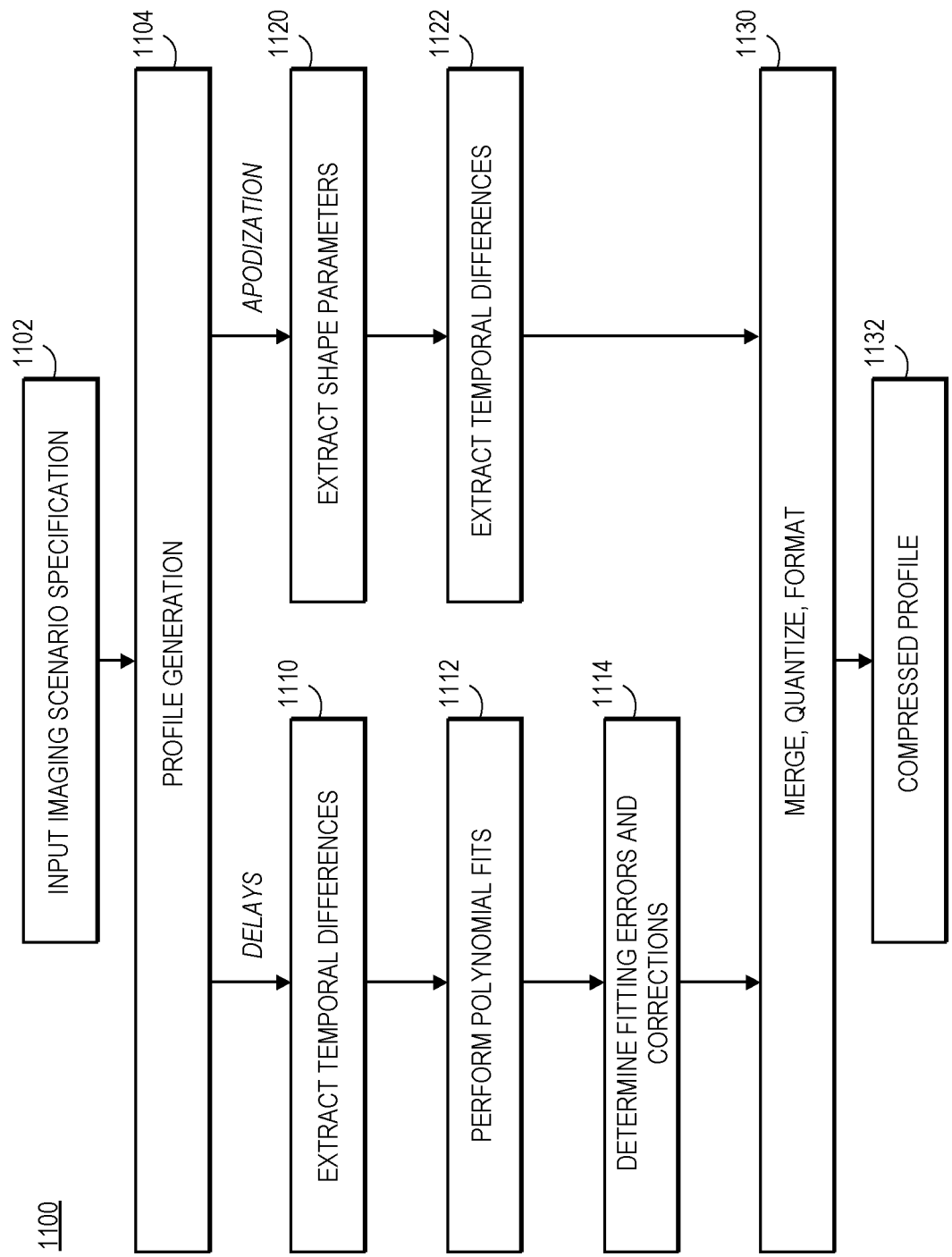
FIG. 11 is a flow chart showing a method for compressing data in an ultrasound beamformer, according to some embodiments of the disclosure.

FIG. 11 is a flow chart showing a method 1100 for compressing data in an ultrasound beamformer, according to some embodiments of the disclosure. At step 1102, an imaging scenario specification is input to the compression algorithm. At step 1104, the imaging scenario specification is used to generate a profile. The profile includes a delay profile and an apodization profile. The delay profile and apodization profile can be generated in parallel.

For generating the delay profile, at step 1110, temporal differences are extracted. At step 1112, polynomial fits are performed. At step 1114, fitting errors are determined and corrections are made. For generating the apodization profile, at step 1120, shape parameters are extracted. At step 1122, temporal differences are extracted. At step 1130, the delay profile and the apodization profile are merged, quantized and formatted. At step 1132, a compressed profile is output.

Alternative Implementations

There are many adjustments and enhancements that may be applied to the example embodiments herein, to tailor the embodiments to different applications, improve performance, and exploit different process and packaging technologies. Several alternative embodiments are described below.

Current analog beamformers produce one output sample per clock cycle, corresponding to one scanline. Alternative embodiments may increase imaging frame rates by producing multiple output samples simultaneously (parallel receive beamforming). Two methods for adding parallel capabilities to a UABF are described below.

Parallel Beamforming

In the first method, the decoding logic and analog core are replicated for each of the desired parallel outputs, and each output is digitized by a separate ADC. In some implementations, parallel outputs are generated by non-overlapping groups of channels within a single beamformer chip, or by separate beamformer chips. The parallel outputs may be digitized by separate ADCs or by a single ADC running at a higher sample rate (time interleaving). Configuration and logic changes, including but not limited to setting different $x_i$ coordinates and delay corrections for channels in each core, are used to independently control the focus while sharing the same digital interface and data rate used for a single core. The input waveforms are sampled simultaneously by the two cores. In some implementations, the data rate is increased but some parameters are shared. In other implementations, the parallel beamformers are fully independent; the interface is unchanged, but power scales linearly with the number of parallel outputs.

In the second method, a single core is used but the digital logic is altered to allow two or more scanlines to be captured in a time-interleaved fashion. The logic keeps track of the delay and apodization required for all active scanlines and feeds a single analog core with control signals that cycle through the scanlines in a regular pattern (e.g., 1, 2, 1, 2, . . . ). The output samples are captured by a single ADC and deinterleaved in the digital domain. In this approach, the integer delay ring size and clock frequencies (UABF and ADC) are scaled by the number of desired parallel outputs.

2-Stage Synthetic Aperture Beamforming

In some implementations, Synthetic Aperture (SA) beamforming is used to apply retrospective transmit focusing, improving image quality relative to a conventional delay-and-sum beamformer. Depending on the desired frame rate and image characteristics, the transmit pulses can be shaped into plane waves or divergent beams instead of being focused within the imaging volume. Typically, in SA beamforming, all channels are digitized. According to some implementations, ultrasound systems rely on two stages of beamforming, where the first stage is used to reduce the volume of data from many transducer elements and the second stage constructs an image using SA techniques. In some examples, analog beamforming techniques are applied to the first stage beamformer in such systems, and the second stage uses digital inputs. In some implementations, the beamformer is operated with fixed receive focus so that its outputs correspond to virtual sources (VS) or virtual receive elements (VRE) that can be fed to the second stage. The initial delays are used throughout the scanline, and apodization parameters are updated dynamically.

2-D (Matrix) Arrays

In various implementations, a delay compression scheme uses spatial fitting techniques to approximate the delay profile. In some implementations, the spatial fits are performed in 1-D to capture time-of-flight differences across a 1-D transducer, as used to construct 2-D images. In alternative implementations, the spatial fits are performed in 2-D, as required by a 2-D transducer for constructing 3-D images. If polynomial fitting is used, a dynamically chosen subset of the $(N+1)(N+2)/2$ possible coefficients (where N is the polynomial order) can be used for each fit. The number of switched-capacitor cells in the delay line is adjusted to reflect the delay range required for the transducer geometry (with 2-D arrays, fewer cells are needed for a given number of channels). In other implementations, the beamformer can be configured for either 1-D or 2-D operation at runtime.

Multiple/Serialized Control Links

The high compression ratios achieved by the approaches described herein allow simplified and lower-power I/O circuits to be used. In particular, in some examples, single-ended CMOS signaling at the sample clock frequency can be used. In other implementations, the parallel data transfer protocol described herein is serialized into one or more high-speed physical links to reduce pin counts and wiring complexity. In some examples, the high-speed physical link is a low voltage differential signaling link (LVDS). In other implementations, multiple control links for parallel beamformers are aggregated on one or more high-speed physical links.

CMOS technology is available in a range of possible "process nodes" that offer different feature sizes and performance tradeoffs to the designer. Alternative versions of the UABF may be developed using smaller process nodes than 0.18 μm. At a process node with smaller features (such as 65 nm or 28 nm), digital circuits can be packed much more densely and consume less power, relative to analog circuits maintaining the same functionality. The following architecture variations exploit these tradeoffs.

In one example embodiment, each channel has its own delay and apodization capabilities, and the time-aligned signals from all channels are summed (via charge sharing) to construct the beamformer output. This "flattened" architecture provides the most flexibility, at the cost of a large analog circuit area that does not scale with process. Area reductions in the analog core can be obtained by switching to a "hierarchical" architecture that performs summations, delay, and/or apodization in two or more stages. For example, subarrays of 8 channels can be beamformed and fed to a second stage having 16 inputs, resulting in a two-stage beamformer with a total of 128 channels. The delay range (and hence circuit area) of each stage can be reduced according to the number of channels included in the summation. In this example, the channels are grouped according to their physical locations on the transducer and that the delay profile varies slowly across the transducer. Additional encoding and decoding logic partitions the delays across stages and controls the analog core accordingly.

In modern digital circuits, the energy losses associated with interconnects have increased relative to those of computation and memory. Alternative embodiments repartition the strobe generators to produce control signals closer to the associated analog switches. In some implementations, logic is shifted between the channel-specific and shared strobe generators. In other implementations, the channel-specific strobe generators are partitioned into sub-blocks for different portions of the analog core. In some implementations, the shared strobe generators are eliminated.

Higher-density digital logic can also be used to reduce the off-chip bandwidth and system complexity used to provide compressed delay/apodization profiles to a UABF. The higher-density digital logic essentially rebalances the workload between encoding (compression) and decoding (decompression). One example is to provide sparse samples of the desired delay and/or apodization values and use interpolation techniques within the decoder to reconstruct the complete profile. Another example is to incorporate a second stage of compression using a different algorithm (for example "Deflate", used by the ZIP and PNG file formats) to further reduce data rates. In the limiting case, the delay and apodization values can be generated within the UABF directly from the geometric parameters of the imaging scenario, referring to disclosure above.

Additional design options can be exercised by the designers of future UABF products. In one alternative implementation, the fractional component of delays is computed after the integer component (reversing the order used by the example embodiments). Compression and decompression are performed on output-referred delay profiles without the transformation from input-referred to output-referred (as described above). In another, different fitting techniques (higher polynomial order, or different bases such as Fourier or Chebyshev series) are used to improve accuracy or tailor the delay profile to specific imaging scenarios.

Variations and Implementations

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the clocking and filtering functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that use sampled analog, some of which may be associated with processing real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to clocking in sampled analog systems, illustrate only some of the possible clocking functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES, EXAMPLES, AND IMPLEMENTATIONS

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for clocking data from the digital core onto a first data output of a macro using a first clock, the first clock being a macro clock; means for clocking the data from the first data output of the macro into the physical interface using a second clock, the second clock being a physical interface clock; means for clocking a first reset signal from the digital core onto a reset output of the macro using the macro clock, the first reset signal output used as a second reset signal; means for sampling the second reset signal using a third clock, which provides a clock rate greater than the rate of the second clock, to generate a sampled reset signal; and means for resetting the second clock to a predetermined state in the physical interface in response to a transition of the sampled reset signal.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A system for compressing and decompressing data in an ultrasound beamformer, comprising:
    an encoder to encode differences in delay between samples, which compresses delay data based at least in part on a smoothness of a delay profile with respect to location on an ultrasound beamformer transducer and over time and compresses apodization data based at least in part on a smoothness of an apodization profile, wherein the ultrasound beamformer transducer comprises transducer elements with different locations on the ultrasound beamformer transducer; and
    a decoder including a multiplier, an adder, and a multiplexor, wherein the decoder decompresses compressed delay data and compressed apodization data, wherein the decoder is embodied on an ultrasound beamformer chip, wherein the encoder is external to the ultrasound beamformer chip, and wherein the encoder is connected to the ultrasound beamformer chip via an input/output interface.

2. The system of claim 1, wherein the input/output interface includes a simple source synchronous parallel interface.

3. The system of claim 1, wherein the encoder uses a low-order polynomial fitting to capture a change in delay data across the ultrasound beamformer transducer over time.

4. The system of claim 1, wherein the encoder uses local corrections to compensate for polynomial fitting errors.

5. The system of claim 1, further comprising a transducer channel, wherein a transducer channel delay for the transducer channel is a difference between a selected output sample time and a time-of-flight from a transmit origin to a focal point and back to a transducer element of the transducer elements.

6. The system of claim 5, wherein the encoder compresses the transducer channel delay.

7. The system of claim 1, wherein the encoder compresses delay data using a spatial fitting technique.

8. The system of claim 1, wherein the encoder is configured to generate the delay profile using spatially smooth polynomial fit to capture a change in delay data across the ultrasound beamformer transducer over time.

9. The system of claim 1, wherein the encoder is configured to generate the apodization profile using scaling coefficients to capture a change in apodization data across ultrasound beamformer transducer over time.

10. The system of claim 1, wherein the encoder is embodied on a sequencer.

11. A method comprising:
   compressing apodization data for an analog ultrasound beamformer;
   compressing delay data for the analog ultrasound beamformer based at least in part on a smoothness of a delay profile with respect to location on an ultrasound transducer and over time, the ultrasound transducer comprising a plurality of ultrasound transducer elements at different locations; and
   decompressing the compressed apodization data and the compressed delay data.

12. The method of claim 11, further comprising multiplexing the compressed apodization data and the compressed delay data.

13. The method of claim 11, further comprising transmitting the compressed apodization data and the compressed delay data to the analog ultrasound beamformer.

14. The method of claim 13, wherein the transmitting is performed over a simple source synchronous parallel interface for connecting to the analog ultrasound beamformer.

15. The method of claim 11, wherein an encoder performs the compressing the apodization data and the compressing the delay data.

16. The method of claim 15, wherein the encoder uses a low-order polynomial fitting applied to the delay data.

17. The method of claim 11, wherein the decompressing is performed on a different chip than the compressing the delay data.

18. A system for compressing and decompressing data in an ultrasound beamformer, comprising:
   a sequencer comprising an encoder to encode differences in delay between samples, wherein the encoder compresses delay data based at least in part on a smoothness of a delay profile with respect to location on an ultrasound transducer and over time, and wherein the encoder compresses apodization data based at least in part on a smoothness of an apodization profile, wherein the ultrasound transducer comprises a plurality of ultrasound transducer elements having different locations on the ultrasound transducer; and
   an ultrasound analog beamformer in communication with the sequencer, the ultrasound analog beamformer comprising a decoder that decompresses compressed delay data and compressed apodization data.

19. The system of claim 18, wherein the ultrasound analog beamformer performs a fractional delay component before an integer delay component in beamforming.

20. The system of claim 18, wherein the delay data represents delays relative to a time of an output sample.

* * * * *